United States Patent [19]

Adorni

[11] 4,366,714
[45] Jan. 4, 1983

[54] PRESSURE/TEMPERATURE PROBE

[75] Inventor: Napoleone Adorni, Milan, Italy

[73] Assignee: CISE S.p.A., Milan, Italy

[21] Appl. No.: 110,368

[22] Filed: Jan. 8, 1980

[30] Foreign Application Priority Data

Aug. 1, 1979 [IT] Italy .................. 9309 A/79

[51] Int. Cl.³ .......... G01L 19/04; G01K 1/26
[52] U.S. Cl. ........................... 73/708; 73/154; 73/753; 73/766; 374/143
[58] Field of Search ............. 73/345, 723, 154, 708, 73/714, 766, 362.4, 362.5; 338/13, 14, 28, 25, 30, 3, 4

[56] References Cited

U.S. PATENT DOCUMENTS

| | | | |
|---|---|---|---|
| 2,318,102 | 5/1943 | Ruge | 338/2 X |
| 2,344,642 | 3/1944 | Ruge | 338/3 |
| 2,421,907 | 6/1947 | Postlewaite | 338/4 |
| 2,583,930 | 1/1952 | Cotton | 338/13 X |
| 2,607,220 | 8/1952 | Martin | 73/154 X |
| 2,663,781 | 12/1953 | Rundell | 338/4 |
| 2,967,428 | 1/1961 | Burgert | 73/362.4 X |
| 3,011,342 | 12/1961 | Simm | 73/154 X |
| 3,290,928 | 12/1966 | Curry | 338/3 X |
| 3,745,835 | 7/1973 | Smith | 73/345 |
| 3,891,956 | 6/1975 | Allemann | 73/345 |
| 3,926,056 | 12/1975 | Brown | 73/345 X |
| 4,028,943 | 6/1977 | Hyanova et al. | 73/345 |
| 4,146,957 | 4/1979 | Toenshoff | 338/28 |
| 4,172,389 | 10/1979 | Branch | 73/766 |
| 4,262,532 | 4/1981 | Butler et al. | 73/345 |

OTHER PUBLICATIONS

Publication: "Construction of a Probe for Measuring Temperature and Pressure in Deep Wells", *Geothermics*, vol. 9, pp. 251–259, [1980(G.B.)].

*Primary Examiner*—Daniel M. Yasich
*Attorney, Agent, or Firm*—Hopgood, Calimafde, Kalil, Blaustein & Judlowe

[57] ABSTRACT

An improved pressure/temperature probe whose accuracy will not be affected by the pressures and temperatures to which it is subject or by the resistance of the connecting cables. The probe includes a separate pressure transducer and temperature transducer which are connected in series to a constant current source. In addition to the pressure reading taken by the pressure probe, a temperature reading of the pressure probe is derived from the pressure probe. This temperature reading provides the actual temperature of the pressure probe and permits highly accurate temperature correction. The pressure probe is constructed and arranged so as to have a high thermal time constant while the temperature probe is constructed and arranged to have a low thermal time constant.

7 Claims, 3 Drawing Figures

PRESSURE/TEMPERATURE PROBE

BACKGROUND AND SUMMARY OF THE INVENTION

The present invention concerns an electric circuit and a mounting arrangement suitable for pressure and temperature probes which permit remote determinations without influence by the electrical resistance of the conductors and with a minimum number of conductors as compared to the signals obtained, together with other purposes and advantages which will become evident to those skilled in the art from the description which follows. The invention also concerns a structure for the probes combined with said circuit.

In accordance with the invention, in the electrical circuit in question a pressure probe and a temperature probe are arranged in series in a DC supply circuit; conductors connected to the ends of the probes and to the other points of detection of signals supply voltage signals at a distance from the probes, with the use of a cable having a plurality of conductors, and particularly having seven conductors.

In one practical embodiment, two measurement conductors are connected to the ends of each probe and two conductors on the diagonal of the resistance bridge constituting the pressure probe; one of the conductors at the ends of the pressure probe is in common with the conductor of the temperature probe arranged in series. Therefore in addition to the two supply conductors only five conductors are required for the obtaining of the voltage signals. The pressure probe may consist either of a simple bridge or of a bridge with two resistors in series on the supply circuit, without this in any way changing the nature of the invention.

In order to permit values of current such as required by the pressure probe, the temperature probe in series is formed of a plurality of resistors, particularly of platinum, which are arranged in parallel.

The invention will be better understood from the following description and the accompanying drawing which shows one practical, non-limitative embodiment of the invention. In the drawing

DESCRIPTION OF THE PREFERRED EMBODIMENTS

Figure 1:
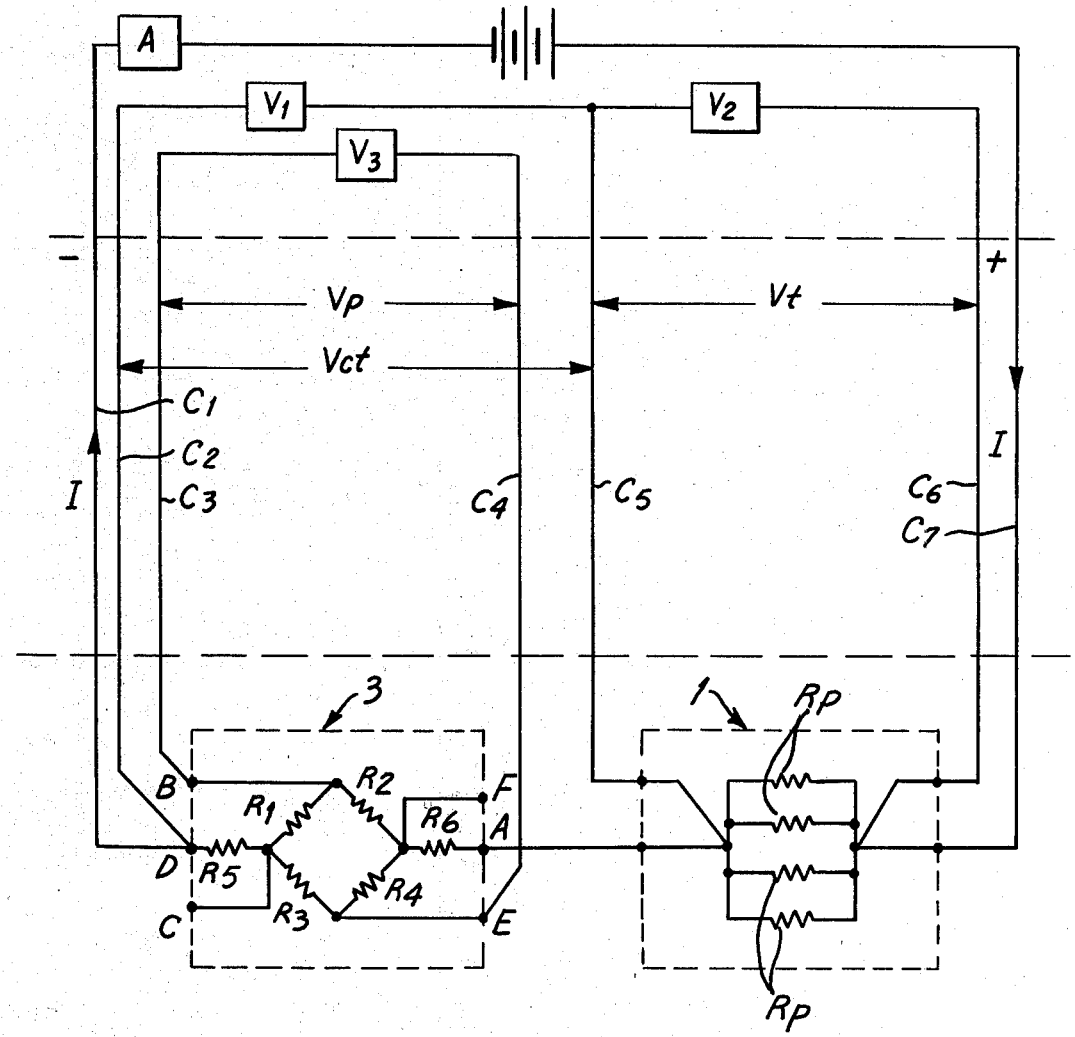
FIG. 1 is a circuit diagram.

The electric circuit used for the temperature probe 1 and the pressure probe 3, shown in FIG. 1, makes it possible to obtain all necessary information by using a cable which has only seven conductors $c_1, c_2, c_3, c_4, c_5, c_6, c_7$ and by armoring insulated from the circuit so as to be able to use it to verify the insulation; the verification can be effected also continuously by the data acquisition system.

The measurement circuit does not introduce the electrical resistance of the conductors into the measurement.

Figure 2:
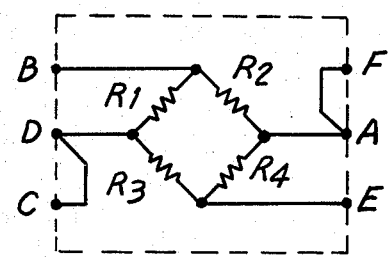
FIG. 2 shows a variant of the pressure probe.

Contained within the circuit, there is shown an extensimetric pressure transducer 3 developed with four resistors $R_1, R_2, R_3, R_4$ in a bridge and with two resistors $R_5$ and $R_6$ in series on the supply diagonal. FIG. 2 shows a similar transducer, but without the two resistors $R_5$ and $R_6$. The transducers which can be used for the circuit in question are commercial transducers developed for nuclear use and are available in one type or the other depending on the capacity, and the circuit is able to accept both. The connections are indicated by A, B, C, D, E, F.

The temperature transducer 1 is formed of four 100 ohm resistors $R_p$ of platinum connected in parallel and inserted in individual sheathings of thin-wall stainless steel threaded on the outer surface in order to improve the transmission of the heat and accordingly decrease the temperature constant.

The time constant of the four resistors constituting the temperature transducer is on the order of 1 second (the determination was made in accordance with British standard No. BS1904(1964), Section 3.15).

The pressure transducer 3 and the temperature transducer 1 are connected electrically in series and fed with constant direct current I by the two conductors $c_1, c_7$. Current I is measured by a suitable current measuring device A.

The supply voltage $V_{ct}$ of the pressure transducer is measured by voltage measuring device $V_1$ between the conductors $c_2$ and $c_5$; the value of the voltage $V_p$ on the other diagonal of the bridge $R_1, R_4$ measured by voltage measuring device $V_3$ between the conductors $c_3$ and $c_4$, divided by the supply voltage, represents the pressure signal. The pressure signal $V_p/V_{ct}$ is subject to an error which is dependent on the temperature at which the pressure transducer is. This temperature can be determined, after calibration, by the resistance of the said pressure transducer $V_{ct}/I$.

The voltage $V_t$ at the ends of the temperature transducer is measured via voltage measuring device $V_2$ across the conductors $c_5$ and $c_6$, and the value of the temperature can be determined, after calibration, by the resistance $V_t/I$ of said temperature transducer.

The values of the said quantities can be measured at a distance from the probes. In the case of one particular application in drill wells of great depth, the said values can be measured at the mouth of the well.

The current I is constant and does not depend on the resistance of the cable $c_1, c_7$; the voltages $V_p, V_{ct}, V_t$ are measured with instruments of high input impedance and therefore they also are not affected by the resistance of the cable.

For the correction of the temperature error in the signal supplied by the pressure transducer, the temperature value supplied by the platinum resistors $R_p$ cannot be used; as a matter of fact, while a small time constant is desirable for these resistors, the thermal time constant of the pressure transducer is inevitably much greater, so that, in variable temperature systems, the transducers are not actually isothermal.

For applications such as the one indicated above, with suitable mounting of the pressure transducer it can be readily seen to it that its temperature varies even more slowly, so as to assure that all of its parts—outer covering, diaphragm deformable with the pressure and extensimeters—are all isothermal. In this way there is obtained an effective correction of the temperature error.

Figure 3:
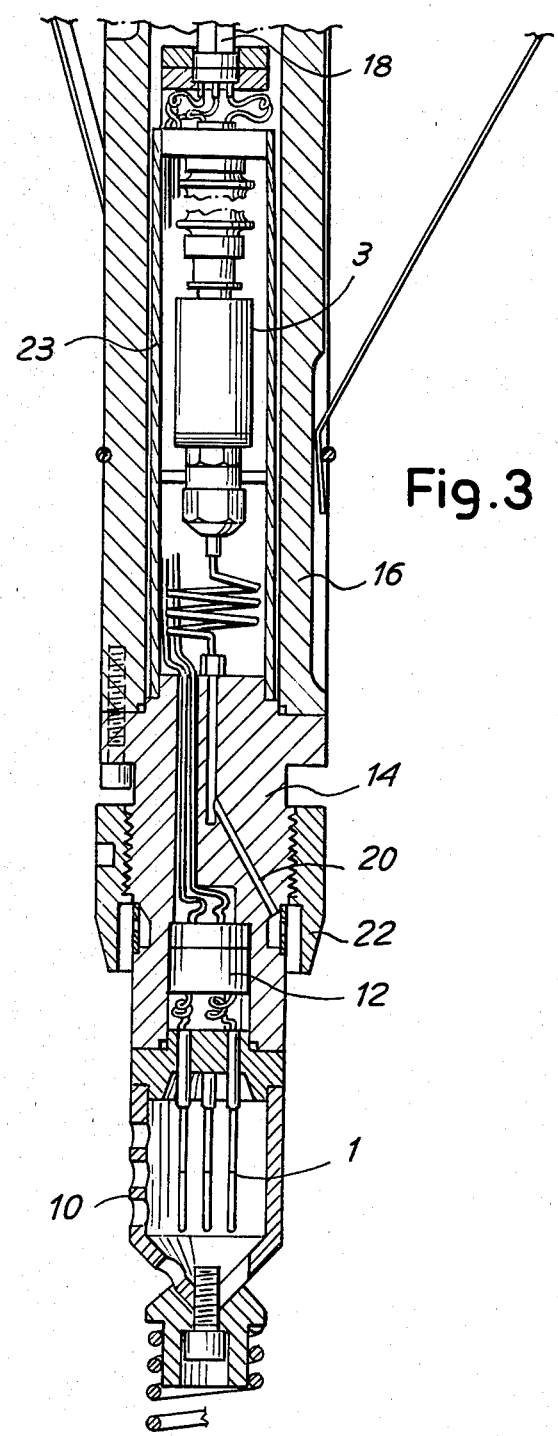
FIG. 3 shows an example of the mounting of the two probes.

In order to increase the thermal time constant of the pressure transducer and assure the greatest possible uniformity of the temperature of all of the parts of which it is formed, the said transducer is mounted in the probe in such a manner as to have the least possible thermal contact with it, as shown in FIG. 3; furthermore, it is surrounded by a tube 23 of large thickness, of a material which is a good conductor of heat, such as copper or aluminum, which in its turn has the least possible thermal contact with the probe and with the transducer.

The said mounting has led to a thermal time constant of the pressure transducer which is greater than one hour.

This value is more than sufficient to assure that from the measurement of Vt there is obtained the exact temperature of the transducer necessary to correct the pressure signal Vp/Vct for the temperature error by which it is affected.

The temperature transducer 1 is advantageously formed by connecting in parallel four resistors Rp, so as to be able to feed it with the same current as the pressure transducer 3. The current for the pressure transducer is, as a matter of fact, about four times greater than the current which can be handled by a single platinum resistor Rp of a value such as to give a good precision of measurement.

In FIG. 3 there is shown the mounting of the two transducers in the probe. The temperature transducer 1 has the four resistors Rp within a space defined and protected by a cap 10 having a wide borehole. 12 is a connector for the said transducer, which is mechanically borne by a coupling 14, engaged on a sheath 16 which receives the tube 23 containing the pressure transducer 3. The latter is connected to the transducers of the line after they have passed through a watertight seal, which does not form part of the object of the invention, via a connector 18. The outside pressure reaches the transducer 3 via a passage 20, whose inlet is suitably protected by a collar 22.

It is to be understood that the drawing shows merely an exemplification given solely as practical example of the invention and it may be varied in its forms and arrangements without thereby going beyond the scope of the concept of the invention itself.

I claim:

1. An improved pressure/temperature measuring apparatus comprising:
    a remote measuring probe having a metal tubular sheath including a lower end, said probe having an electrical resistance-type pressure sensor mounted in said sheath and an electrical resistance-type temperature sensor mounted in said lower end of said sheath, said sensors electrically connected in series;
    a measurement site distant from said remote probe having a constant direct current source connected to said remote probe, first electrical means for determining the temperature of said temperature sensor to provide a temperature reading at said temperature sensor, second electrical means for determining the pressure at said pressure sensor to provide a pressure measurement at said pressure sensor and third electrical means for determining the temperature of said pressure sensor from a measurement of said pressure sensor after calibration calculation procedures of said pressure sensor to thereby permit the temperature correction of said pressure sensor; and
    electrical connector means connecting said first, second and third electrical means and said direct current source to said sensors in said remote probe.

2. The pressure/temperature apparatus as claimed in claim 1, further including:
    an outer sheath;
    a tubular body disposed within said outer sheath, said tubular body being relatively thick and constructed of a material having high thermal conductivity so as to insure uniformity of temperature within said tubular body;
    said pressure sensor being located within said tubular body, said pressure sensor being spaced apart from said tubular body so as to minimize the thermal conductivity between said sensor and said body; and
    wherein said pressure sensor is constructed of materials having a thermal time constant greater than one hour, and said temperature sensor is constructed of materials having a thermal time constant of the order of one second.

3. The pressure/temperature apparatus as claimed in claim 1, wherein said pressure sensor includes a resistance bridge, said means for determining the pressure at said pressure sensor include means for determining the voltage across the non-supply diagonal of said resistance bridge and means for determining the supply voltage across said bridge, said means for determining the temperature of said pressure sensor include means for determining the supply voltage across the ends of said resistance bridge and the current through said pressure sensor.

4. The pressure/temperature apparatus as claimed in claim 3, wherein said temperature sensor is formed of a plurality of platinum resistors, said platinum resistors having values such that the current flow therethrough is optimized to the current flow through said pressure sensor.

5. The pressure/temperature apparatus as claimed in claim 3, wherein said temperature sensor comprises four parallel connected platinum resistors.

6. The pressure/temperature apparatus as claimed in claim 3 wherein said pressure sensor comprises a resistance bridge and wherein said electrical connector means include:
    first and seventh conductors coupled to said constant direct current source means and the ends of said series connected pressure and temperature sensors;
    a second conductor connected to the current source end of said resistance bridge;
    third and fourth conductors connected across the non-supply diagonal of the resistance bridge forming said pressure sensor;
    a fifth conductor connected between said pressure and said temperature sensor; and
    a sixh conductor connected to the current source end of said temperature sensor.

7. The pressure/temperature apparatus as claimed in claim 6 further including:
    current measuring means located in the circuit formed by said current source, said first and second conductors and said pressure and temperature sensors;
    first voltage measuring means connected across said third and fourth conductors;
    second voltage measuring means connected across said second and said fifth conductors; and
    third voltage measuring means connected across said fifth and sixth conductors.

* * * * *